(12) United States Patent
Lagarrigue et al.

(10) Patent No.: US 7,262,746 B2
(45) Date of Patent: Aug. 28, 2007

(54) VIDEO WALL

(75) Inventors: Patrick Lagarrigue, Albi (FR); Marc Souviron, Toulouse (FR); Pierre-Yves Lambolez, Albi (FR)

(73) Assignee: Synelec Telecom Multimedia, Saint-Sernin-sur-Rance (FR)

( * ) Notice: Subject to any disclaimer, the term of this patent is extended or adjusted under 35 U.S.C. 154(b) by 204 days.

(21) Appl. No.: 10/385,035

(22) Filed: Mar. 10, 2003

(65) Prior Publication Data
US 2003/0210209 A1 Nov. 13, 2003

(30) Foreign Application Priority Data
Mar. 8, 2002 (EP) .................... 02290587

(51) Int. Cl.
*G09G 5/00* (2006.01)
(52) U.S. Cl. ..................................... 345/1.3
(58) Field of Classification Search ........... 345/1.1–1.3
See application file for complete search history.

(56) References Cited
U.S. PATENT DOCUMENTS 3,842,404 A * 10/1974 Crook ........................ 345/1.1
5,691,777 A 11/1997 Kassatly
5,835,498 A * 11/1998 Kim et al. .................. 370/537
6,229,849 B1 5/2001 Mihara
6,556,594 B2 * 4/2003 Uchide ....................... 370/537
6,628,243 B1 * 9/2003 Lyons et al. ................. 345/1.1

FOREIGN PATENT DOCUMENTS
JP 2000-324489 * 11/2000

* cited by examiner

*Primary Examiner*—Amr A. Awad
*Assistant Examiner*—Tom V Sheng
(74) *Attorney, Agent, or Firm*—Welsh & Katz, Ltd.

(57) ABSTRACT

A video wall (2) is formed of several adjacent displays ($14_1$-$14_{15}$). The display surfaces of the adjacent displays form a continuous or quasi-continuous display surface for the video wall. The wall has an input adapted for receiving images from multiplexed sources. The images from the multiplexed sources are demultiplexed in a demultiplexer (22). The demultiplexer provides images from the demultiplexed sources to processors ($24_1$-$24_{15}$) for display on the adjacent displays.

Figure 1:
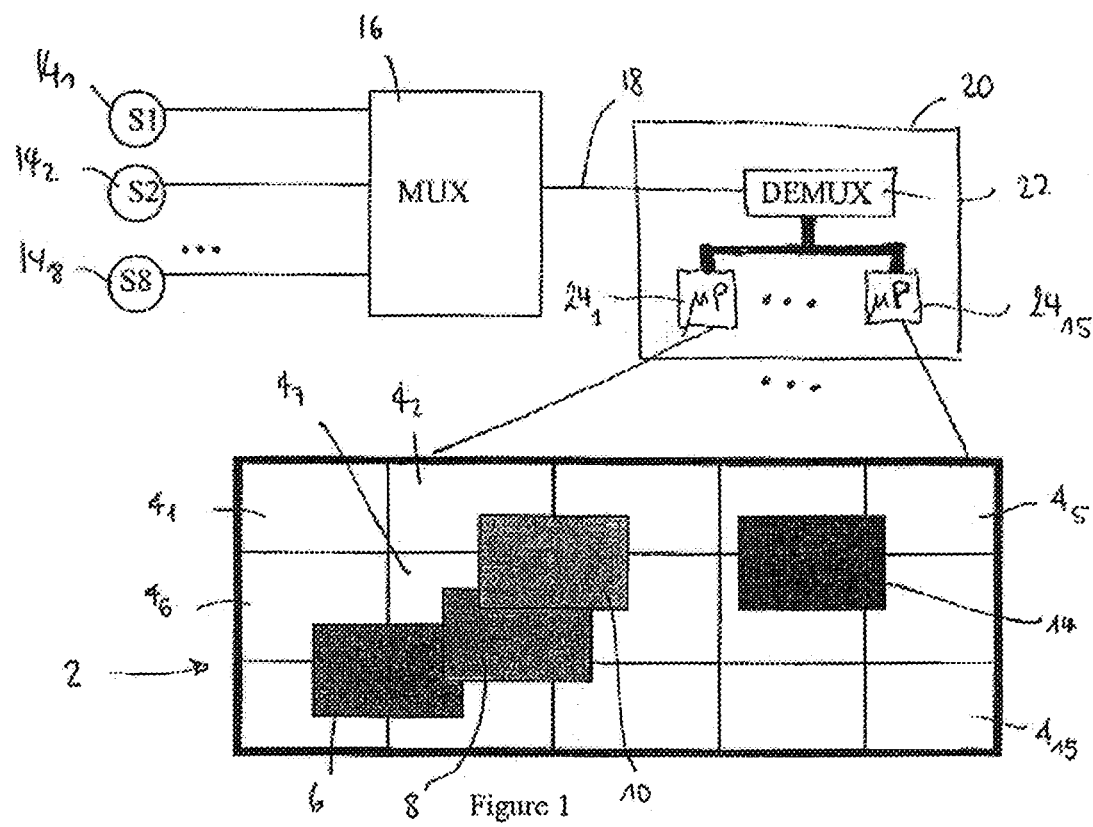

Using multiplexed sources makes it possible to reduce the number of cables at the input to the wall or to increase the number of images that may simultaneously be displayed on the wall.

19 Claims, 1 Drawing Sheet

VIDEO WALL

The invention relates to the field of video walls. A video wall is formed of adjacent several displays, which define a continuous display surface. Strictly speaking, the display surface of a video wall is not continuous—since it is formed of the display surfaces of the different displays that form the video wall. However, the display surface appears continuous or almost continuous to the user; at least, it may be used as a continuous surface for the display of flows of images or videos over the whole surface of the video wall. The displays in a video wall may notably comprise projectors or LED panels. Video walls are for instance sold by the applicant under the trademark WallStation or by Electrosonic under the trademark Vector.

Lanetco (Archamps, France) sells under the trademark SuperCube a rear projection system or projector, which may be assembled to provide a video wall. Each projection system has eight composite video inputs and allows live display of two of the inputs; the product is announced as processing 4 or 8 windows simultaneously in the near future. In other words, each projection system has a processor; the processor receives images from various sources on the various inputs to the projection system and selects the image(s) or part of image(s) to be displayed on the display surface of the projection system.

When the projection systems are assembled in a video wall, 1 to 8 live images or videos per projection system may be displayed on the wall. There remains an issue of input of the images or live videos to the wall. Assume the wall is formed of eight projection systems, each projection system having two live inputs.

If two sources are connected in parallel to all projection systems, only two different live images may be displayed simultaneously on the video wall. This type of connection still makes it necessary to provide two acquisition stages per projection system. The system in such a configuration would comprise 16 cables for connecting each projection system to the two live inputs and 16 acquisition stages for receiving images from the two live inputs in each projection system.

In order to display P sources on the eight projection systems of the video wall, one would use a commutation switch with P inputs and 16 outputs; each output would be connected to one live input of a projection system. Such a solution still requires 16 cables and 16 acquisition stages.

The applicant/assignee sells under the trademarks Wall-Station and Prism a video wall having a single electronic circuit receiving images on four inputs. An image processor is provided for each output and selects the image or part of image to be displayed on a given display. In the WallStation and Prism systems, there are 32 outputs. A similar system is sold by Electrosonic under the trademark Vector; in this product, the electronic circuit has up to 6 inputs and 24 outputs.

One problem in prior art video walls is the need to replicate cables and acquisition stages in the video wall for displaying images or videos.

In a distinct field of the art, U.S. Pat. No. 6,229,849 discusses coding methods for digital broadcasting by satellite broadcast a plurality of programs processed by data compression coding using MPEG technique. Programs are frequency-multiplexed and transmitted with a fixed transmission rate, or with the transmission rate dynamically changed by a statistical multiplexing technique.

JP-A-2000 324 489 discusses a multi-screen image sending out system. The image to be displayed is divided into two or more fields, according to the number of screens of the multi-screen. The fields are multiplexed, transmitted and received. They are demultiplexed, and each field is sent to the relevant screen for display.

U.S. Pat. No. 5,691,777 discusses a teleconference system, with a number of monitors in various separate locations. A particular remote site selects the video signals he wishes to receive—that is selects some of the other participating sites. The video signals which were selected are multiplexed and selectively transmitted to the particular remote site.

Accordingly, there is a need for an image mixer for a video wall, comprising a video wall comprising at least two displays forming a continuous or quasi-continuous display surface, at least one input adapted for receiving images from multiplexed sources and at least a demultiplexer adapted for receiving images from multiplexed sources and for outputting images from demultiplexed sources.

The use of multiplexed sources makes it possible to reduce the number of cables at the input to the wall or to increase the number of images that may simultaneously be displayed on the wall.

The demultiplexer may be adapted to demultiplex images from time-multiplexed sources. The wall may also comprise a multiplexer having at least two inputs adapted for receiving images from at least two sources and adapted for multiplexing images received on said inputs; there is also provided a connection between the multiplexer and the demultiplexer or demultiplexer.

It is another possible solution that the multiplexer be adapted for time-multiplexing images received on said inputs.

The number of images per second for one source in the images from multiplexed sources may be lower than the number of images per second for said source provided on said multiplexer input. This reduction in the number of images makes it possible to accommodate with a connection having a total throughput lower than the sum of the throughput of the various sources.

There is also a need for a process for displaying images on a video wall comprising at least two displays forming a continuous or quasi-continuous display surface, the process comprising:
  receiving images from multiplexed sources;
  demultiplexing the received images and outputting images from demultiplexed sources; and
  displaying images of at least one of said sources.

The step of demultiplexing may comprise time-demultiplexing the received images.

The process may further comprise the steps of
  receiving images from at least two sources;
  multiplexing the images received from said sources; and
  transmitting images from the multiplexed sources.

In this case, the step of multiplexing could also comprise time-multiplexing the images received from said sources.

One may then, in the step of multiplexing, reduce the number of images per second for at least one of said sources.

Figure 2:
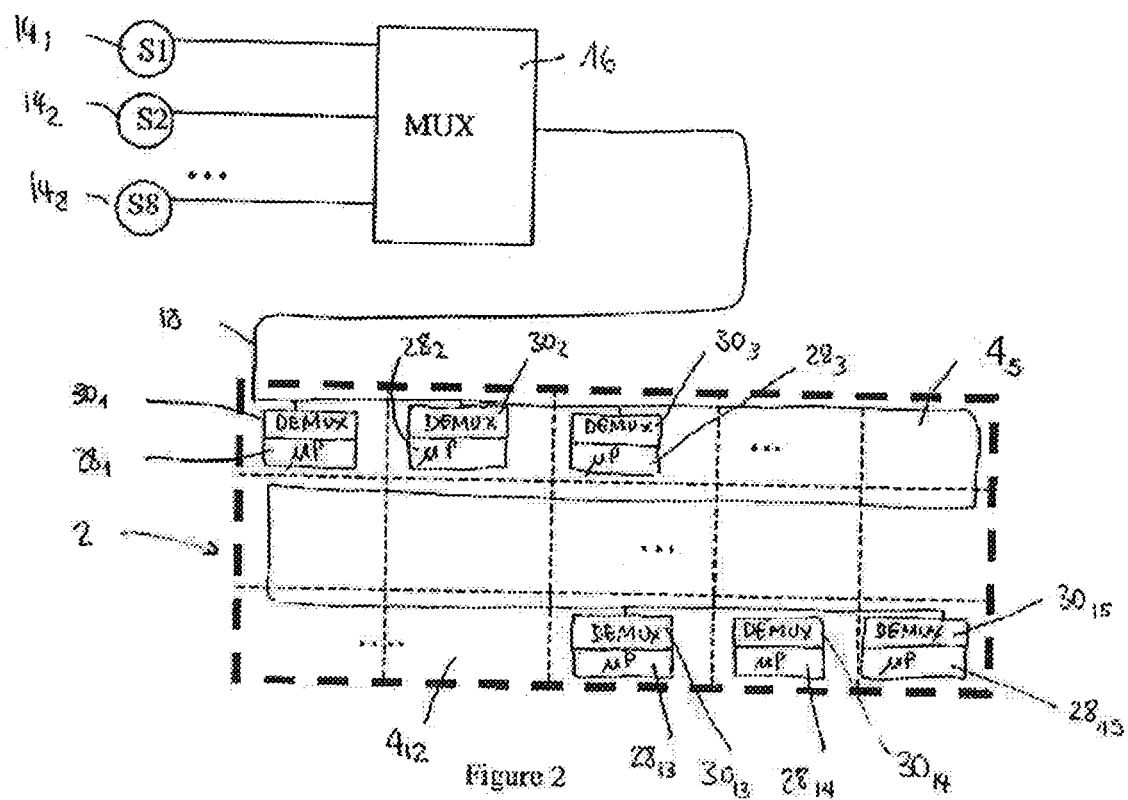

A video wall and a mixer embodying the invention will now be described, by way of non-limiting example, and in reference to the accompanying drawings, where FIG. 1 shows a schematic view of a video wall in a first embodiment of the invention;

FIG. 2 shows a schematic view of a video wall in a second embodiment of the invention.

The invention suggests multiplexing flows of images provided by sources, so as to be able to use a single cable for feeding the images of the multiplexed sources to the video wall. In case the necessary throughput for transmitting images to the video wall is higher than the throughput possible on the cable, the refresh rate of images of one source or more may be decreased, while keeping the same resolution.

At the video wall, images from multiplexed sources are received and demultiplexed before being displayed.

In the rest of this description, the invention is described in reference to an exemplary video wall comprised of 15 displays, with eight sources. FIG. 1 thus shows video wall 2, with its displays $4_1$ to $4_{15}$, which are arranged in three rows of five displays each. As shown on FIG. 1, video wall 2 has a quasi-continuous display surface, formed of the display surfaces of the different displays. For the sake of explanation, four images 6, 8, 10 and 12 from four different sources are displayed on the video wall. As usual in video wall, the number of images may vary and a background image—not represented—may be displayed over the whole display surface of video wall 2.

References $14_1$, $14_2$ and $14_8$ on FIG. 1 represent image sources S1 to S8. These may be any sources in a format that may be displayed on the displays forming video wall 2; standards for video sources notably comprise PAL, SECAM, NTSC and Japan. For each of these standards, various substandards may exist, such as M, N or 4.43 for NTSC. Standards for graphic sources comprise interlaced or non-interlaced VGA, SVGA, XGA, SXGA, UXGA or other standards used for different image resolutions. The various standards or formats of images—video or graphics—that may be used for the image sources only depend on displaying capabilities of the displays forming the video wall. The examples given above should not be construed as limiting the types of images or sources usable according to the invention.

The images output by the various sources are provided to a multiplexer 16. Multiplexer 16 receives the images from the various sources and multiplexes the images from the various sources for further transmission to the video wall, thanks to connection 18—in the preferred embodiment a single cable.

Multiplexed images transmitted over cable 18 are received in a wall circuit 20. The circuit comprises a demultiplexer 22, which demultiplexes the images of the various sources and provides images of the demultiplexed sources to eight outputs. Demultiplexed images are then provided to image processors $24_1$ to $24_{15}$. The bold connection in FIG. 1 between demultiplexer 22 and processors $24_1$ to $24_{15}$ is representative of the demultiplexed sources being provided to the processors.

Image processors select among the various demultiplexed sources the image(s) or part of image(s) to be displayed. In the example represented on FIG. 1, processor $24_2$ would select the upper left part of the images 10 of one source for display on the display $4_2$. Processor $24_7$ would select part of images 6, part of images 8 and part of images 10 for display on display $4_7$. A processor may also select various images in different formats, for a picture-in-picture display; the number of images to be displayed on each display is not limited by the number of inputs to the electronic system.

The circuit in the embodiment of FIG. 1 is thus similar to the electronic circuit sold by the applicant under the trademarks WallStation and Prism; however, there is provided a demultiplexer for 22 demultiplexing the images of the multiplexed sources received on cable 18. This makes it possible to use a single cable for transmitting to the video wall the images of the various sources $14_1$ to $14_8$—as compared to the prior art solution where one cable is necessary for each input of the electronic circuit.

The circuit 20 of FIG. 1 may also be developed from the prior art circuit of the type used in the WallStation and Prism products; as discussed above, such prior art circuits have four inputs. Adding a demultiplexer for each input makes it possible to receive 4.p sources with a reduced additional cost—p being the number of images multiplexed on a single input to the circuit. One would then use four cables, for displaying up to 4.p images on the video wall.

The invention thus makes it possible to reduce the number of cables and/or to increase the number of images to be displayed and/or decrease the size of the switcher or eliminate the switcher.

FIG. 2 shows a schematic view of a video wall in a second embodiment of the invention. The video wall of FIG. 2 differs from the one of FIG. 1 in that an image processor is provided in each display of the wall, instead of having the various processors grouped in a single wall circuit 20. This is similar to the solution used in the prior art SuperCube product. FIG. 2 thus shows the various processors—only six of these being represented for the sake of clarity—, the outline of the displays being represented in dashed lines.

In this case, each processor $28_1$ to $28_{15}$ is further provided with a demultiplexer or with a demultiplexing stage $30_1$ to $30_{15}$. Cable 18 is connected in parallel to the demultiplexer of each image processor. The demultiplexer of the processor of each display is thus provided with the multiplexed sources. Each demultiplexer may thus demultiplex one or several of the sources, for subsequent display by the processor on the display surface of the corresponding display.

This makes it possible to use a single connection 18 for displaying the eight sources—instead of having to use as many cables as displays. One may also use more than one cable in the connection—e.g. for increasing the number of multiplexed sources. It is not necessary to use switching matrixes for switching the various images. Last, the invention makes it possible to increase the number of images that may be displayed on each display of the wall. As in the example of FIG. 1, a processor may also select various images in different formats, for a picture-in-picture display.

Assume the video wall is comprised on 15 displays, each display being adapted to display the images of four sources. Assume there are eight sources, as in the example of FIG. 1 or 2. The prior art solution of Lanetco, with a 4-input display system, makes it necessary to provide a switching matrix having 8 inputs (for the 8 sources) and 60 outputs corresponding to the four inputs of each of the 15 displays. Furthermore, there must be provided 60 cables between the outputs of the switching matrix and the inputs to the various displays. The solution of FIG. 2 only requires a multiplexer with 8 inputs (for the 8 sources) and an output to connection 18. Connection 18 goes to one of the displays, multiplexed sources being forwarded farther by the same connection or by a similar one.

In the example of FIG. 1 as well as in the example of FIG. 2, various methods may be used for multiplexing images of the various sources. The images are preferably time multiplexed, since this makes it possible to use the same type of cables as in the prior art. Time multiplexing notably makes is possible to use prior art encoding solution at the physical layer of the cable; one may use for cable(s) 18 a Digital Visual Interface using the transition minimised differential signalling (TMDS) protocol as serial encoding protocol.

The bandwidth allowed for each source in the multiplexer may be fixed; it may also vary dynamically, according to the types of sources or number of sources inputted to the video wall.

If the bandwidth granted to transmitting a given source is smaller that the throughput necessary for this source, the refresh rate for the images of the source may simply be decreased. This makes it possible to display complete images on the video wall—even if the refresh rate is smaller. The resolution is preferably maintained. For instance, assume each video source has a resolution of 1280*1024 pixels, with three colours R, G and B, each colour being coded on 256 levels or 8 bits. If the refresh rate is 60 images per second, the bandwidth necessary for transmitting one such video source is 1280*1024*60=78 643 200 pixel/s that is 1.89 Gbit/s.

If the allowable throughput on the cable is 2 Gbit/s, one may allocate 0.25 Gbit/s to each source—in the simplest embodiment where the same throughput is allocated to each source. In this case, the refresh rate for each source would become 60*0.25/1.89=7.9 images per second.

Reducing the refresh rate of the images makes it possible to display images having the optimal resolution. In this case, the number of images per second for one given source in the flow of images of the multiplexed sources is lower than the number of images per second in the source as originally input to the multiplexer. The easiest solution in such a case is to serially transmit one image from each source on the connection 18; in other words, the sources are scanned successively and one image is transmitted each time a source is scanned.

In the example given above, the same refresh rate is applied to all sources; this is not necessary. One may for instance select different refresh rates according to the types of sources; in this case, graphics sources may require a lower refresh rate than video sources. One may also lower the refresh rate for a source, which is not currently being displayed on the video wall. Refresh rates may be varied dynamically.

If the bandwidth on connection 18 is sufficient, there may not be any need to limit the bandwidth of the sources. For instance, assume connection 18 is formed of two cables each having a bandwidth of 1 Gbit/s. Assume video images have a resolution of 500*500 pixels, with 30 images per second and a coding of each pixel of 24 bits. In this example, the throughput for each video image is 0.18 Gbit/s. If only four sources are multiplexed, connection 18 clearly has enough bandwidth for transmitting the images of the multiplexed sources, with the full resolution and the refresh rate of 30 images/s.

The process for displaying images of the various sources thus involves multiplexing the images of the various sources, transmitting images of the multiplexed sources to the video wall, demultiplexing the images of the various sources at the video wall and displaying the images of the demultiplexed sources.

The invention is not limited to the embodiments disclosed above; the video wall may comprise more or less than 15 projecting systems. The example of FIG. 1 shows eight image sources; one may use more or less than 8 sources. There may also be more than one image processor per display.

In the description of the preferred multiplexing scheme, the resolution of the images is maintained; this solution is preferred for usual applications of video walls—such as control rooms. One may also decide to decrease resolution of the images of some sources, while keeping the same refresh rate. Both solutions may be combined—some sources having a lower refresh rate and some other a lower resolution.

Last, the connection between the demultiplexer and the processors in FIG. 1 could be similar to the one of FIG. 2; that is, if each processor is provided with a demultiplexer, cable 18 could simply be connected in parallel to the demultiplexer or demultiplexing stage of each processor. In this case, as in FIG. 2, a given processor may demultiplex only the images of the source(s) he displays.

In addition, instead of connecting the various demultiplexers and processor as represented on FIG. 2, one could use an amplifier receiving images of multiplexed sources on connection 18, and forwarding 15 copies of the received images to the various processors.

Last, one may cascade the multiplexer in order to increase the number of sources, while using the same devices.

In all figures and explanations, item not related to the invention—such as possible amplifiers—are not represented.

The invention claimed is:

1. A video wall, comprising:
   at least two displays forming a continuous or quasi-continuous display surface,
   at least one input adapted for receiving images from multiplexed sources, each one of the received images originating from an original source before being multiplexed,
   at least one demultiplexer that is adapted to receive images from multiplexed sources and to output images from demultiplexed sources, and
   the at least one demultiplexer being further adapted to make each image output from the demultiplexed sources available to both of the displays for display on the continuous or quasi-continuous display surface.

2. The video wall of claim 1, wherein the demultiplexer is adapted to demultiplex images from time-multiplexed sources using TMDS protocol.

3. The video wall of claim 1, further comprising a multiplexer having at least two inputs adapted for receiving images from at least two sources, the multiplexer being adapted for multiplexing images received on said inputs; a connection between the multiplexer and said at least one demultiplexer.

4. The video wall of claim 3, wherein the multiplexer is adapted for time-multiplexing images received on said inputs using TMDS protocol.

5. The video wall of claim 3, wherein the number of images per second for one source in the images from multiplexed sources is lower than the number of images per second for said source provided on said multiplexer input.

6. The video wall of claim 3, wherein the video wall comprises one demultiplexer and wherein said demultiplexer is adapted to provide the images from demultiplexed sources to each of said displays.

7. The video wall of claim 3, wherein each display in the video wall comprises a demultiplexer and a processor, and wherein a demultiplexer is adapted to the images from demultiplexed sources to the processor.

8. The video wall of claim 1, wherein the video wall comprises one demultiplexer and wherein said demultiplexer is adapted to provide the images from demultiplexed sources to each of said displays.

9. The video wall of claim 1, wherein each display in the video wall comprises a demultiplexer and a processor, and wherein a demultiplexer is adapted to the images from demultiplexed sources to the processor.

10. A process for displaying images on a video wall comprising at least two displays forming a continuous or quasi-continuous display surface, the process comprising:
provide at least two displays that form a continuous or quasi-continuous display surface,
receiving images from multiplexed sources, each one of the received images originating from an original source before being multiplexed,
demultiplexing the received images and outputting images from demultiplexed sources,
providing each one of the images output from the demultiplexed sources to all of the displays, and
displaying images from at least one of the demultiplexed sources on the continuous or quasi-continuous display surface formed by the at least two displays.

11. The process of claim 10, wherein the step of demultiplexing comprises time-demultiplexing the received images using TMDS protocol.

12. The process of claim 10, further comprising the steps of
receiving images from at least two sources;
multiplexing the images received from said sources; and
transmitting images from the multiplexed sources.

13. The process of claim 12, wherein the step of multiplexing comprises time-multiplexing the images received from said sources using TMDS protocol.

14. The process of claim 13, wherein the step of multiplexing further comprises reducing the number of images per second for at least one of said sources.

15. The process of claim 12, wherein the wall comprises a single demultiplexer and wherein the step of demultiplexing comprises, at the demultiplexer, demultiplexing the received images and outputting images from demultiplexed sources to all displays in the wall.

16. The process of claim 12 wherein each display in the wall comprises a demultiplexer and wherein the step of demultiplexing comprises, at each demultiplexer, demultiplexing the received images and outputting images from demultiplexed sources.

17. The process of claim 10, wherein the wall comprises a single demultiplexer and wherein the step of demultiplexing comprises, at the demultiplexer, demultiplexing the received images and outputting images from demultiplexed sources to all displays in the wall.

18. The process of claim 10, wherein each display in the wall comprises a demultiplexer and wherein the step of demultiplexing comprises, at each demultiplexer, demultiplexing the received images and outputting images from demultiplexed sources.

19. A video wall, comprising:
at least two displays forming a continuous or quasi-continuous display surface,
at least one input adapted to receive images from multiplexed sources,
at least one demultiplexer that is adapted to receive images from multiplexed sources and that is adapted to output images from demultiplexed sources, each one of the received images originating from an original source before being multiplexed,
at least two image processors, each image processor being adapted to select images or parts of images among the various demultiplexed sources to be displayed by each display.

* * * * *